United States Patent
Lippitt

(10) Patent No.: US 10,197,083 B2
(45) Date of Patent: Feb. 5, 2019

(54) LOW PROFILE CONNECTION PIN FOR AUDIO SYSTEM

(71) Applicant: Bose Corporation, Framingham, MA (US)

(72) Inventor: Benjamin C. Lippitt, Worcester, MA (US)

(73) Assignee: BOSE CORPORATION, Framingham, MA (US)

( * ) Notice: Subject to any disclaimer, the term of this patent is extended or adjusted under 35 U.S.C. 154(b) by 315 days.

(21) Appl. No.: 15/079,470

(22) Filed: Mar. 24, 2016

(65) Prior Publication Data
US 2017/0276162 A1    Sep. 28, 2017

(51) Int. Cl.
| | |
|---|---|
| F16B 21/00 | (2006.01) |
| F16B 21/08 | (2006.01) |
| F16B 19/02 | (2006.01) |
| H04R 1/02 | (2006.01) |
| H04R 27/00 | (2006.01) |

(52) U.S. Cl.
CPC ............. *F16B 21/08* (2013.01); *F16B 19/02* (2013.01); *H04R 1/026* (2013.01); *H04R 27/00* (2013.01); *H04R 2201/025* (2013.01)

(58) Field of Classification Search
CPC ............................... F16B 21/08; F16B 21/165
USPC ........... 411/348; 70/395, 176, 34; 403/322.2
See application file for complete search history.

(56) References Cited

U.S. PATENT DOCUMENTS

| | | | | |
|---|---|---|---|---|
| 2,685,877 A | * | 8/1954 | Dobelle | A61F 2/3603 411/21 |
| 2,815,971 A | * | 12/1957 | Guinane | F16B 7/0406 281/16 |
| 3,180,390 A | * | 4/1965 | Ockert, Jr. | F16B 21/165 411/348 |
| 4,016,914 A | * | 4/1977 | Zurko | F16B 5/0208 403/20 |
| 4,278,120 A | * | 7/1981 | Hart | F16B 39/04 411/190 |
| 5,255,586 A | * | 10/1993 | Newhausen | B23D 47/025 403/374.4 |
| 5,542,273 A | * | 8/1996 | Bednarz | E05B 67/365 29/263 |
| 5,749,137 A | | 5/1998 | Martin | |
| 5,803,689 A | * | 9/1998 | Magnus | E21B 41/0007 24/607 |
| 5,988,364 A | * | 11/1999 | Boyce | B41F 17/36 198/867.11 |

(Continued)

*Primary Examiner* — Gary W Estremsky
(74) *Attorney, Agent, or Firm* — Schmeiser, Olsen & Watts LLP

(57) ABSTRACT

A connection pin comprises an elongated neck and a base at an end of the neck. The base may include a first portion, a second portion between the first portion and the neck, and a lip between the first portion and the second portion. A distance between the lip and the neck may be less than a radius of the neck. The connection pin may further comprises at least one spring-loaded element along the neck for maintaining the connection pin in a temporary fixed position relative to another element in which the neck is constructed for insertion and an actuator that retracts the at least one spring-loaded element when in a pressed position. An end of the actuator does not exceed a surface of the base when the actuator is in an unpressed position. An opening in the base may be threaded.

14 Claims, 11 Drawing Sheets

(56) References Cited

U.S. PATENT DOCUMENTS 7,377,137 B1 * 5/2008 Bednarz ................ E05B 63/121
    403/322.2
7,748,939 B2 * 7/2010 Bulow ...................... F16B 5/10
    411/349

* cited by examiner

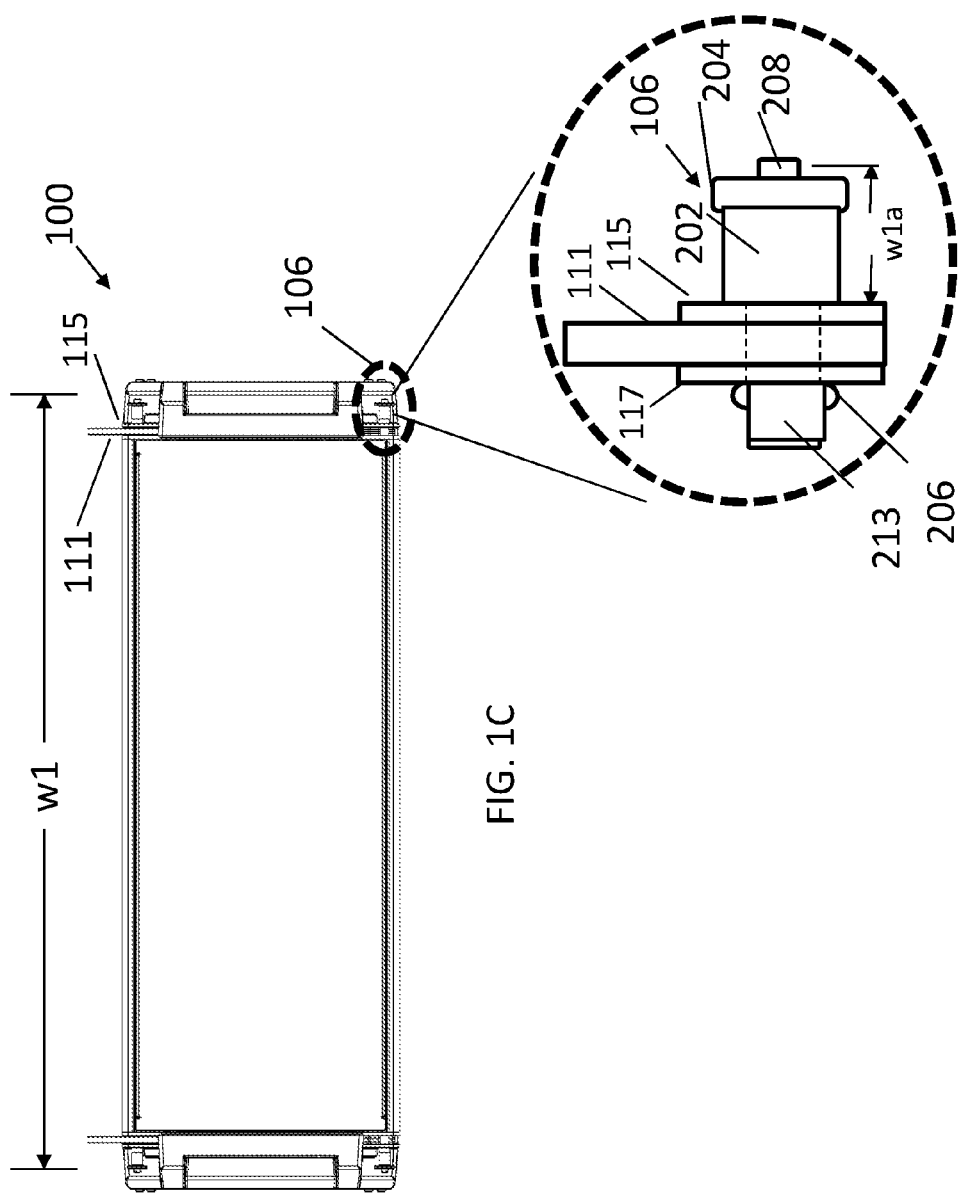

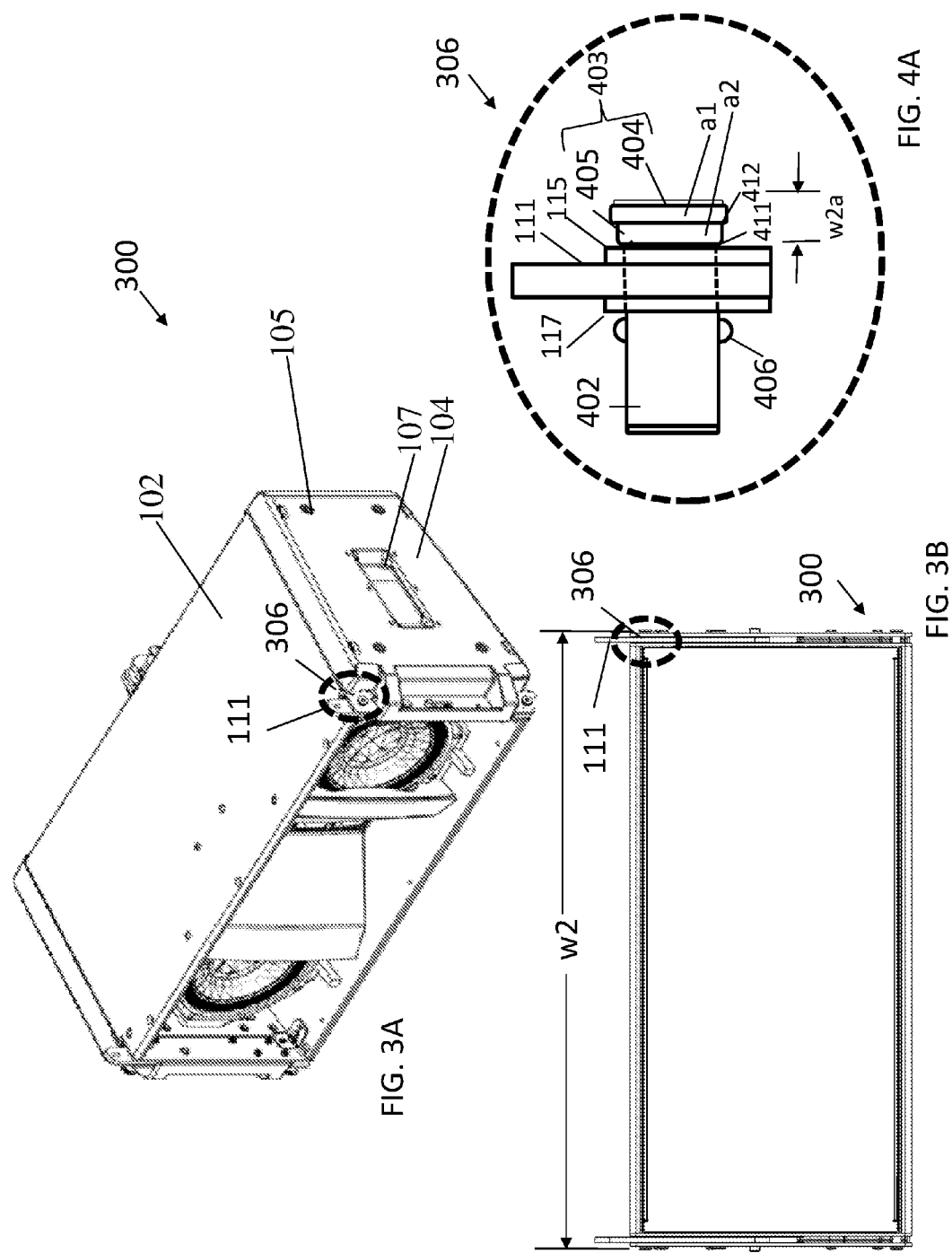

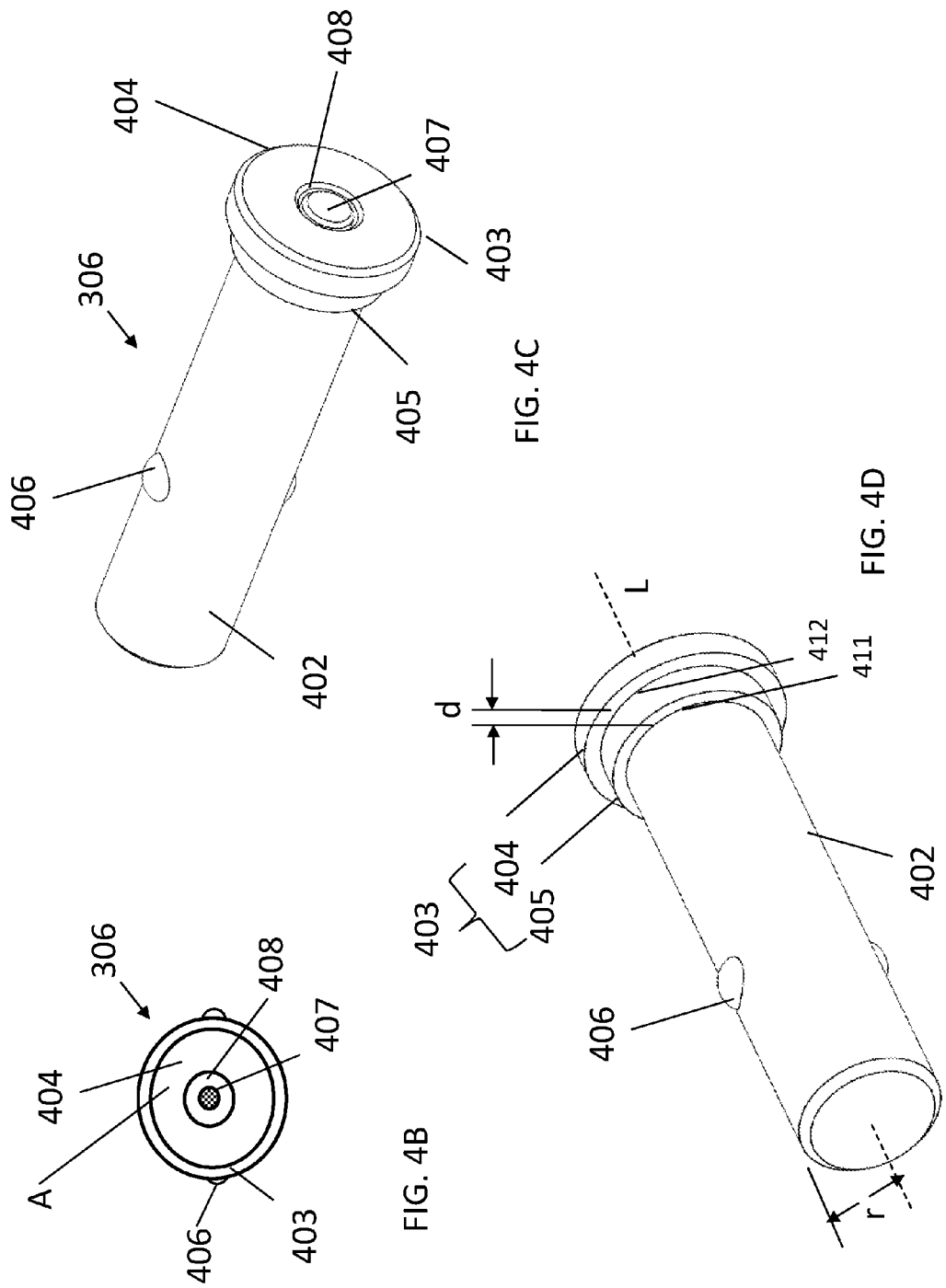

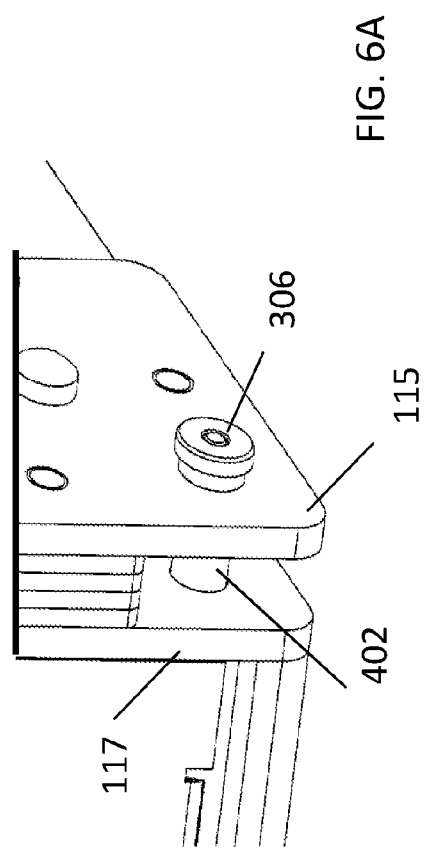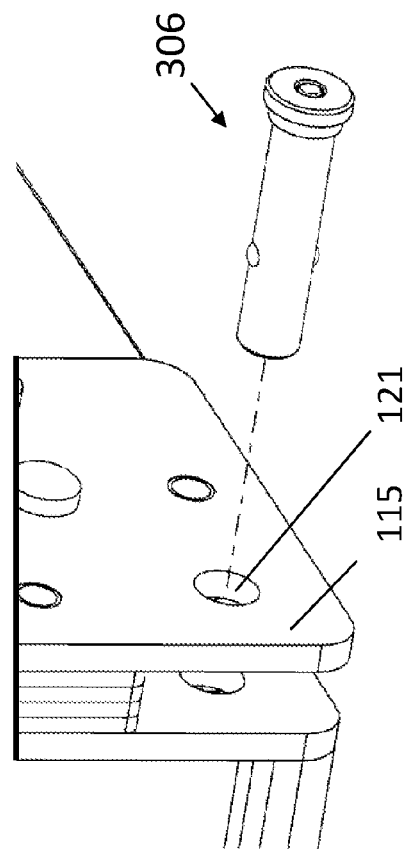

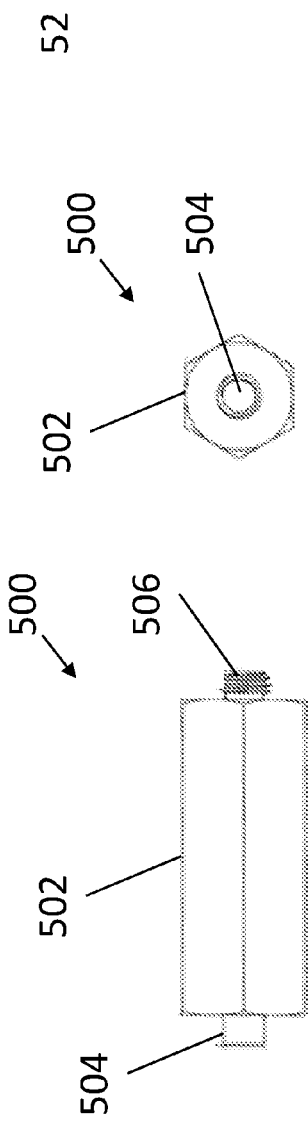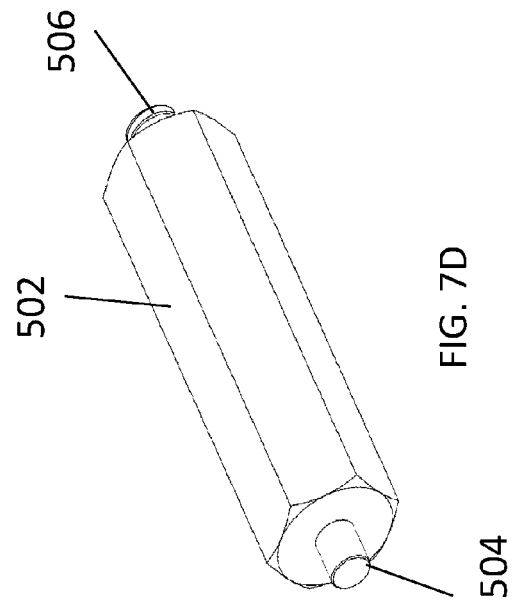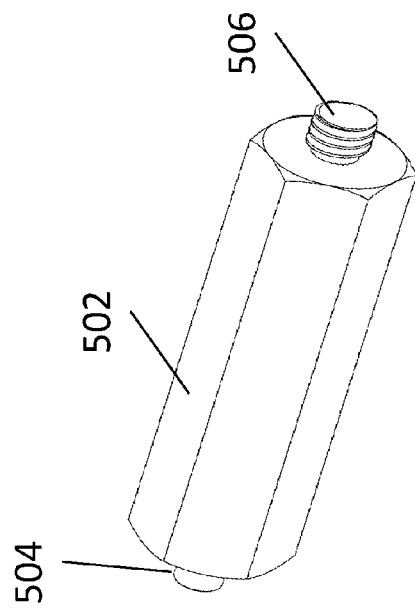

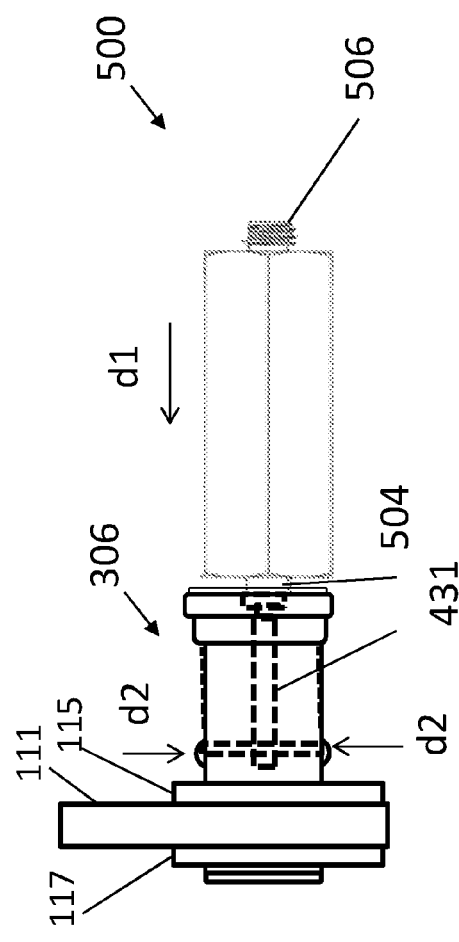
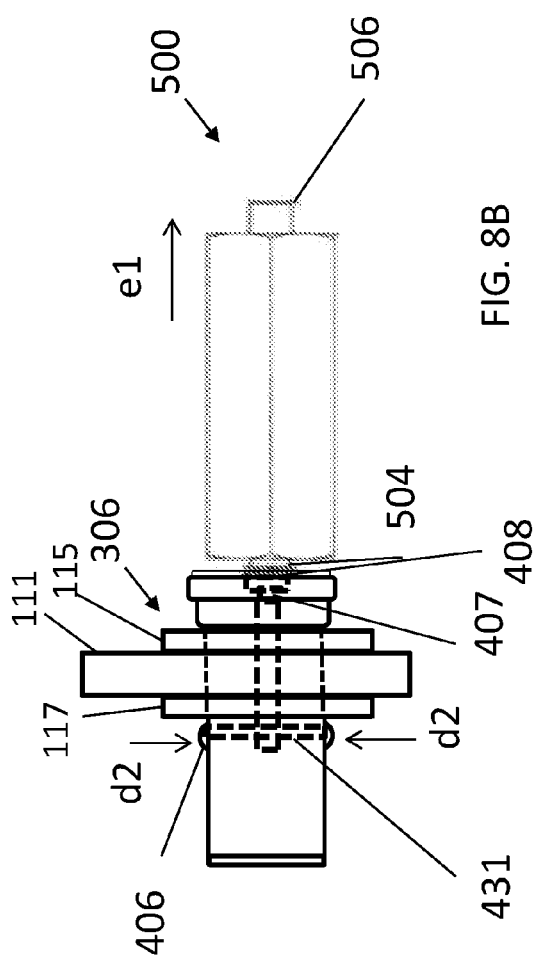

LOW PROFILE CONNECTION PIN FOR AUDIO SYSTEM

BACKGROUND

This description relates generally to acoustic speaker arrays, and more specifically, to low profile connection pins for a speaker array system enclosure.

BRIEF SUMMARY

In accordance with one aspect, a connection pin comprises an elongated neck; and a base at an end of the neck. The connection pin includes at least one of: the base including a first portion; a second portion between the first portion and the neck; and a lip between the first portion and the second portion, wherein a distance between the lip and the neck is less than a radius of the neck; the connection pin further comprising: at least one spring-loaded element along the neck for maintaining the connection pin in a temporary fixed position relative to another element in which the neck is constructed for insertion; and an actuator that resides in an opening in the base and retracts the at least one spring-loaded element when in a pressed position, wherein an end of the actuator does not exceed a surface of the base when the actuator is in an unpressed position; or the opening in the base being threaded.

Aspects may include one or more of the following features:

The connection pin may further comprise another lip between the neck and the second portion, wherein a distance between the lip and the other lip may be less than the radius of the neck.

The lip may be proximal the other lip for reducing an amount of protrusion of the base or neck from the other element.

The other element may be an enclosure of a speaker array module.

The distance between the surface of the base and the first lip may be less than or equal to a distance between the first lip and the second lip.

The threaded opening may be for mating with a tool to remove the connection pin from the other element.

The opening may be constructed and arranged to receive the tool that applies a force to the actuator to activate the spring-loaded element for coupling the connection pin to the other element.

The neck and base may extend in a longitudinal direction of extension. The first portion may have a dimension along the longitudinal direction that is less than that of the second portion along the longitudinal direction.

The first portion may have a dimension extending in a direction perpendicular to the longitudinal direction that is less than that of the second portion along the direction perpendicular to the longitudinal direction.

The spring-loaded element may include a detent ball.

In another aspect, a speaker array module comprises an enclosure; at least one electroacoustic driver in the enclosure; and at least one connection pin removably coupled to the enclosure. The at least one connection pin includes an elongated neck and a base at an end of the neck, the base having a lip that is proximal to the enclosure when the connection pin is coupled to the enclosure. A distance between the lip and the neck is less than a radius of the neck.

Aspects may include one or more of the following features:

The first lip may be proximal the second lip for reducing an amount of protrusion of the base or neck from a sidewall of the enclosure.

A distance between the surface of the base and the first lip may be less than or equal to a distance between the first lip and the second lip.

The connection pin may further comprise at least one spring-loaded element at a region of the neck and an actuator that retracts the at least one spring-loaded element when activated by a tool that applies a force to the actuator.

The spring-loaded element may include a detent ball.

The speaker array module may further comprise an endcap removably coupled to the enclosure. The endcap may have a corner that at least partially surrounds a connection pin of the at least one connection pin for protecting the connection pin from damage.

The speaker array module may further comprise a coupling extending from the speaker array module for coupling with another speaker array module. The coupling may include a hole for receiving a connection pin of the at least one connection pin or for receiving a connection pin from the other speaker array module.

The speaker array module may further comprise an opening in the base, and wherein the actuator is positioned in the opening.

The opening may be a threaded opening for mating with a threaded insertion element of the tool to remove the connection pin from an audio system enclosure.

The opening may be constructed and arranged to receive a non-threaded element of the tool that applies a force to the actuator to couple the connection pin to the audio system enclosure.

The neck and base may extend in a longitudinal direction of extension. The first portion may have a dimension along the longitudinal direction that is less than that of the second portion along the longitudinal direction.

The first portion may have a dimension extending in a direction perpendicular to the longitudinal direction that is less than that of the second portion along the direction perpendicular to the longitudinal direction.

In another aspect, a connection pin kit, comprises a connection pin, the connection pin including: an elongated neck; a base at an end of the neck; an opening in the base; an actuator in the opening; at least one spring-loaded element extending from the neck that is advanced or retracted by the actuator; and a tool for inserting the connection pin into an element or removing the connection pin from the element, the tool comprising: a body extending in a longitudinal direction; a non-threaded insertion element at a first end of the body, and extending in the longitudinal direction, for inserting the connection pin into the element when positioned in the opening of the base; and a threaded insertion element at a second end of the body opposite the first end in the longitudinal direction, for removing the connection pin from the element when positioned in the opening.

Aspects may include one or more of the following features:

Either the non-threaded insertion element or the threaded insertion element may apply a force to the actuator in the opening to retract the at least one spring-loaded element.

A width of the base may be less than a radius of the neck.

The base may include a first portion and a second portion between the first portion and the neck, a first lip between the neck and the second portion, and a second lip between the first portion and the second portion. A distance between the first lip and the second lip may be less than a radius of the neck.

The element may include a speaker array module, and wherein the connection pin removably couples the speaker array module to another speaker array module.

In another aspect, a tool comprises a body extending in a longitudinal direction; a non-threaded insertion element at a first end of the body, and extending in the longitudinal direction, the non-threaded insertion element constructed and arranged for insertion into an opening of a connection pin for inserting the connection pin into an element; and a threaded insertion element at a second end of the body opposite the first end in the longitudinal direction, the threaded insertion element constructed and arranged for insertion into the opening of a connection pin for removing the connection pin from the element.

BRIEF DESCRIPTION

The above and further advantages of examples of the present inventive concepts may be better understood by referring to the following description in conjunction with the accompanying drawings, in which like numerals indicate like structural elements and features in various figures. The drawings are not necessarily to scale, emphasis instead being placed upon illustrating the principles of features and implementations.

FIG. 1C is a front view of the speaker array module of FIGS. 1A and 1B.

FIG. 2 is a front view of a conventional connection pin joint.

FIG. 3A is a perspective view of a speaker array module, in accordance with some examples.

FIG. 3B is a front view of the speaker array module of FIG. 3A.

FIG. 4A is a front view of a low profile connection pin joint, in accordance with some examples.

FIG. 4B is an end view of the low profile connection pin of FIG. 4A.

FIGS. 4C and 4D are perspective views of the low profile connection pin of FIGS. 4A and 4B.

FIGS. 6A and 6B are close-up views of a low profile connection pin inserted into a speaker array module, in accordance with some examples.

FIG. 7A is a side view of a tool, in accordance with some examples.

FIG. 7B is a front view of the tool of FIG. 7A.

FIGS. 7C and 7D are perspective views of the tool of FIGS. 7A and 7B.

FIG. 8A is a diagram illustrating an operation where the tool of FIGS. 7A-7D is used for inserting a low profile connection pin into a speaker array module, in accordance with some examples.

FIG. 8B is a diagram illustrating an operation where the tool of FIGS. 7A-7D and 8A is used for removing the low profile connection pin from the speaker array module, in accordance with some examples.

DETAILED DESCRIPTION

Figure 1A:
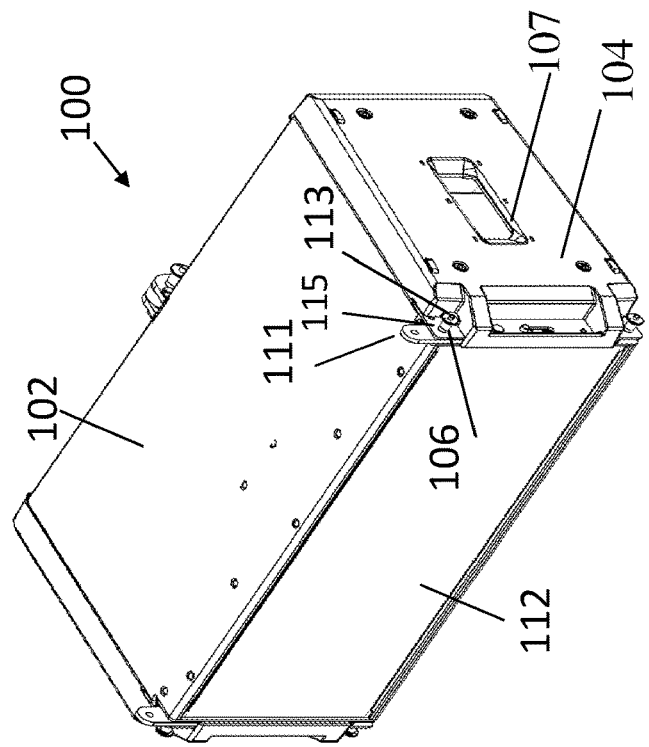
FIG. 1A is an isometric view of a speaker array module.
Figure 1B:
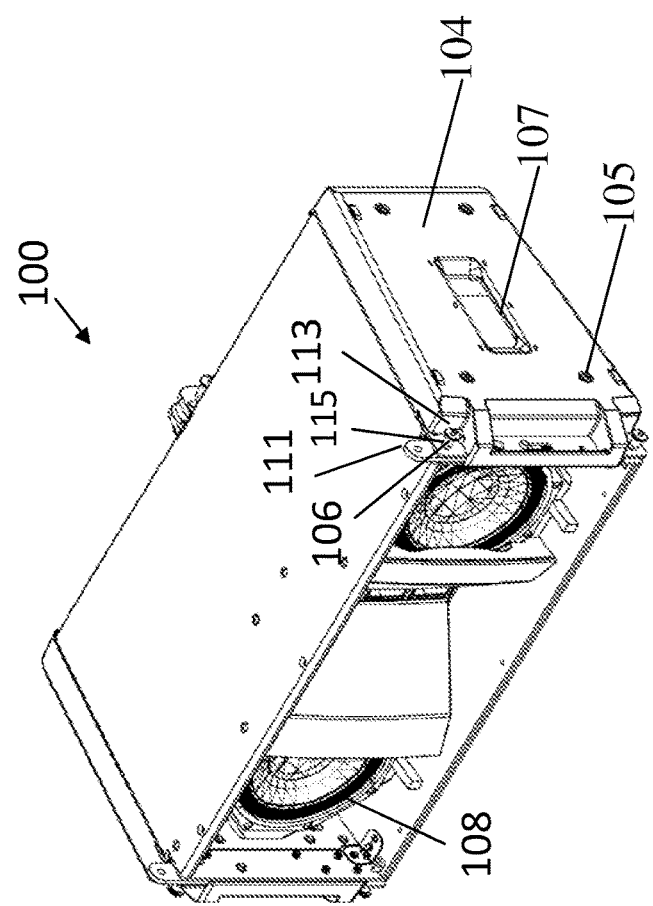
FIG. 1B is an isometric view of the speaker array module of FIG. 1A, including a front grill.
Figure 5:
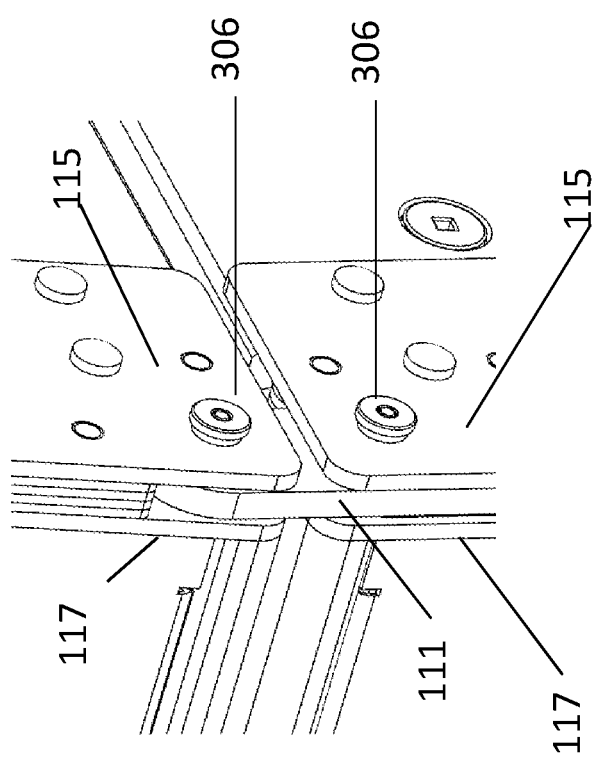
FIG. 5 is a close-up view of two speaker array modules coupled to each other, in accordance with some examples.
Figure 9A:
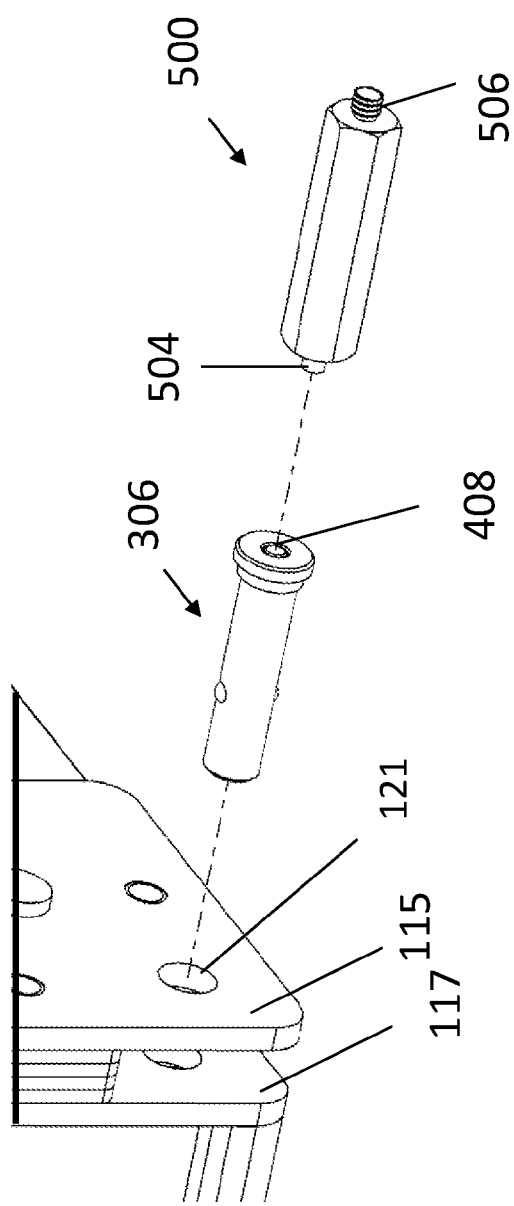
FIGS. 9A and 9B are views of the tool of FIGS. 7A-7D, 8A, and 8B used to insert a low profile connection pin into a speaker array module, in accordance with some examples.
Figure 9B:
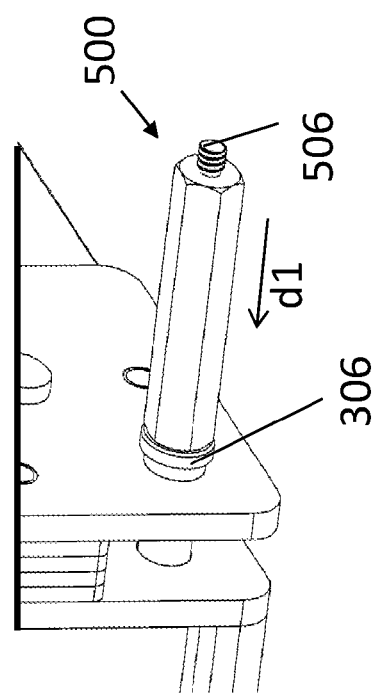
Figure 10A:
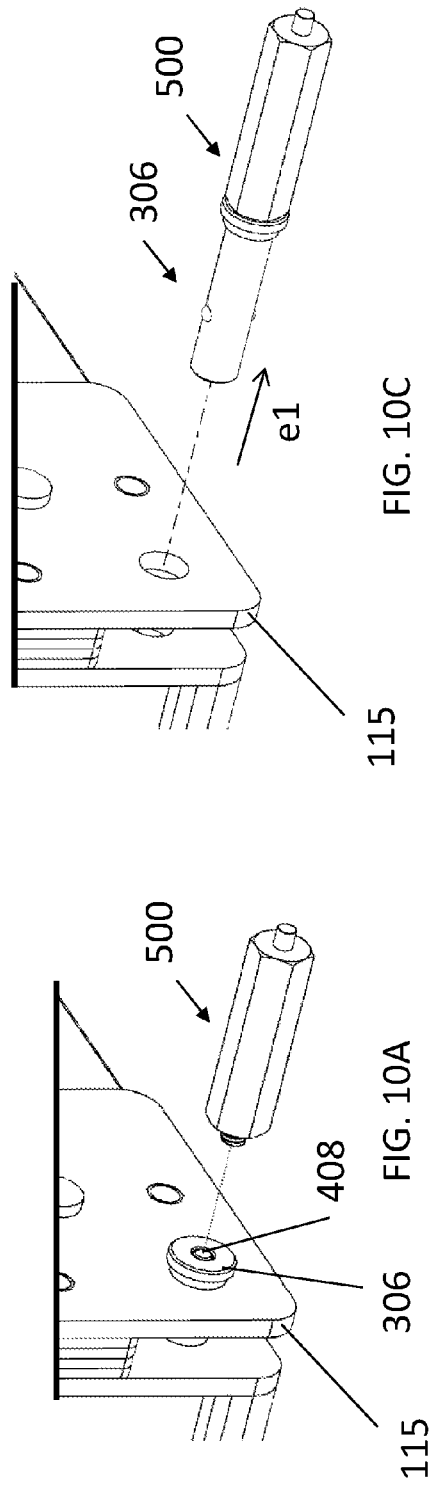
FIGS. 10A-10D are views of the tool of FIGS. 7A-7D, 8A, 8B, 9A, and 9B used to remove a low profile connection pin from a speaker array module, in accordance with some examples.
Figure 10B:
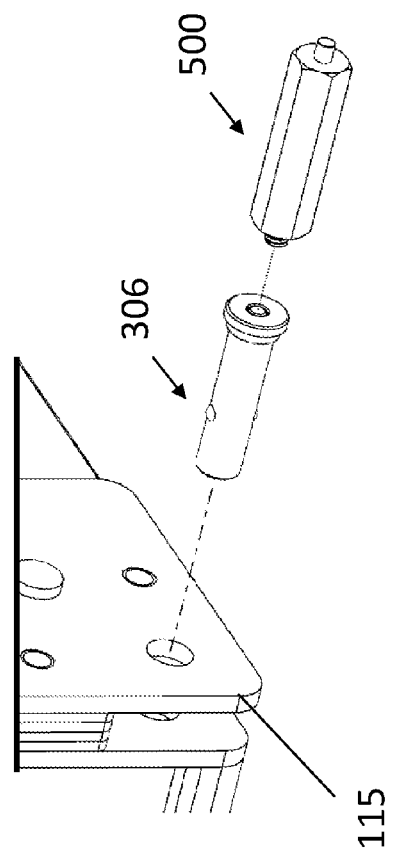
Figure 10C:
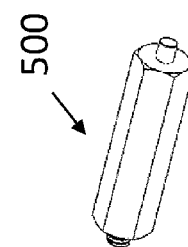
Figure 10D:
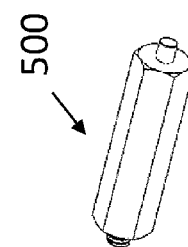

A speaker array module 100 illustrated in FIGS. 1A-1C is constructed and arranged for use in a touring market or a fixed install market. In the touring market, for an event, the speaker array module 100 is physically connected to other speaker array modules with a similar structure and configuration to form an array comprising multiple modules. For example, as shown in FIG. 5, a speaker array module 100 may have a coupling 111 extending from a top of the speaker array module 100 for coupling with a bottom portion of another speaker array module positioned on top of the speaker array module 100 when a connection pin 106 is inserted through the coupling 111. After the event is over, the speaker array modules 100 are separated from each other during deinstallation, and after the connection pin 106 is removed from the coupling 111. Therefore, it is important for a speaker array module 100 to be constructed for a quick, easy to use design.

A fixed install market configuration is constructed and arranged for a single installation, where a speaker array is left in place for an extended period of time. Here, the requirement is that the dimensions, especially width, are important. For example, some venues are constructed with a limited amount of space, where a smaller width is desirable. However, the speed of installation is not a factor as with the touring market configuration.

Regardless of the configuration, i.e., touring or fixed install, a common preference is that the module 100 include endcaps 104 which include handles 107 for ease of manipulating the modules 100 and building an array. Removing endcaps 104 in this manner provides for reduced width and a cleaner profile.

The endcap 104 is coupled to the enclosure 102 by one or more screws 105 or other connectors. The endcap 104 has corners 113 constructed for positioning around the connection pins 106 so as to not to interfere with the insertion and removal of the pins 106. A connection pin 106 at a top region of the enclosure 102 may be inserted through the coupling 111 in a touring market module 100 for locking the coupling 111 in position, either in a stowed position or extended position. Alternatively or in addition, a connection pin 106 at a bottom region of the enclosure 102 may be used to couple a coupling 111 from another module to the enclosure 102.

The connection pin 106 may include a handle 202, a head 204, a shank 213, at least one spring-loaded detent ball 206, and a spring-loaded push actuator 208 that when pushed retracts or releases the balls 206.

However, as shown in FIGS. 1A-1C, the connection pin 106 protrudes from the enclosure 102 by a distance, or protrusion length (w1a), or a length of the handle 202, which may increase the risk of damage to the pin 106, and increase the overall width (w1) of the module 100. Conventional pins 106 take up more space and can catch on things much more easily if not protected by an endcap 104, so when the endcap 104 is removed, the conventional pins 106 are prone to damage, and require time consuming efforts to remove and replace.

Although the endcap 104 may include an indented corner region 113 that provides some protection by at least partially surrounding the protruding connection pin 106, the end of the connection pin 106 is nevertheless prone to damage due to the configuration of the pin 106. Additionally, using a low profile pin and removing the endcaps will produce a simpler and cleaner look to an array. Also, a low profile connection pin can be tamper resistant.

Figure 3C:
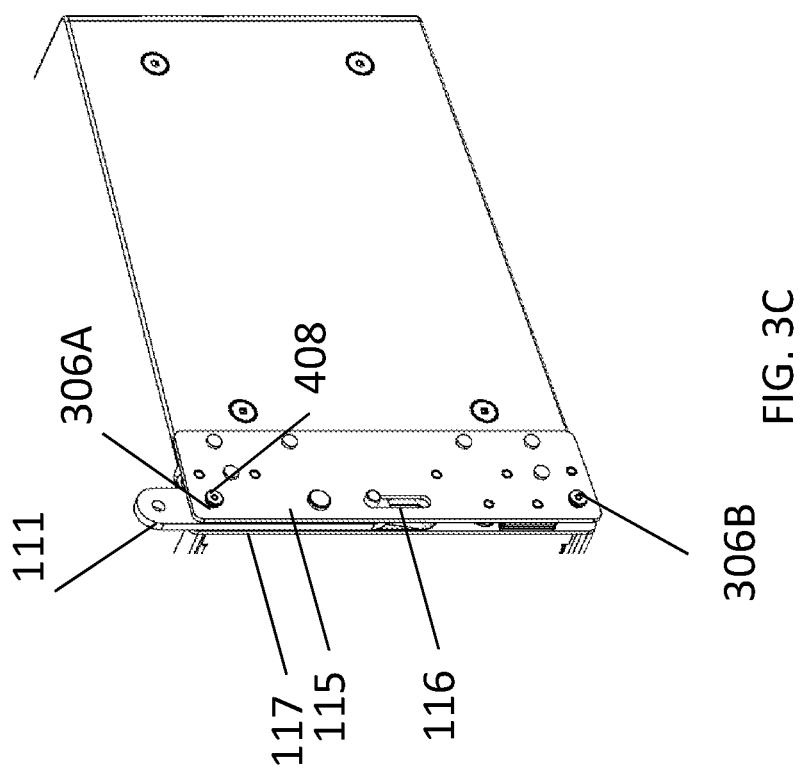
FIG. 3C is a perspective view of a side of a speaker array module with an endcap removed, in accordance with some examples.

The speaker array module 300 illustrated in FIGS. 3A-3C includes a plurality of low profile connection pins 306, in accordance with some examples. The connection pins 306 also referred to as securing pins or quick pins, include quick release features, described herein. The connection pins 306 are constructed and arranged for a reduced overall width (w2) between pins 306 on either side of a module 300, for example, a 3 inch reduction when the endcaps 104 are removed, as compared to the module width (w1) including conventional pins 106 coupled to the module 100 shown in FIGS. 1A-1C and 2.

As shown in FIG. 3C, an upper connection pin 306A can be used to maintain the position of a coupling 111. When the module is moved 100, the coupling 111 may be moved in a stowed position by removing the connection pin 306A, and translating the connection pin 306A in a linear direction so that the top of the coupling 111 is flush with or below the top surface of the enclosure 102. In other words, the coupling 111 can slide up and down between stowed and rigged positions in the absence of the upper connection pin 306A. Alternatively, the coupling 111 may be rotated from its position shown in FIG. 3C to a stowed position to be in flush with or below a surface of the module 100. The upper pin 306A provides a load bearing connection between the coupling 111 and a pair of plates 115 and 117 of an enclosure of another array module above the module 100. A tab location 116 permits an operator to push the coupling 111 up from a stowed position to a rigged position where the coupling 111 extends from the enclosure 102 as shown. Similarly, the lower connection pin 306B provides a similar structural connection between the pair of plates 115 and 117. Here, a coupling from another array module (not shown) is positioned between the plates 115 and 117 so that the coupling of the lower module is coupled to the upper module by the lower connection pin 306B.

As shown in FIGS. 4A-4D, the low profile connection pin 306 is constructed and arranged to removably couple to the enclosure 102 of the speaker array module 300. In other examples, the connection pin 306 can reinforce another coupling between elements of the speaker array module 300.

The connection pin 306 includes an elongated neck 402 and a base 403, also referred to as a head. In some examples, the neck 402 and base 403 are formed from a single stock of machined or molded material, such as steel, stainless steel, or the like. In other examples, the neck 402 is formed separately from the base 403, and later joined to the base 403, for example, by bonding, welding, or other applicable techniques. Here, the base 403 and neck 402 may be formed of the same materials, or formed of different materials. In some examples, as shown in FIGS. 4A-4D, the base 403 is wider than the neck 402 in a direction perpendicular to the direction of extension of the connection pin 306, and/or has a cross-sectional area greater than that of the neck 402 but not limited thereto. In some examples, the neck 402 has a constant diameter from the proximal end to the distal end of the neck 402. In other examples, the neck 402 may have a taper, or gradual reduction in diameter along some or all of the length of the neck 402. In other examples, the neck 402 may have a curvilinear, parabolic, or other shape along at least a portion of the length of the neck 402.

In some examples, the base 403 includes a first portion 404 and a second portion 405. The second portion 405 of the base 403 is between the first portion 404 and a proximal end of the neck 402. In some examples, the first portion 404 and second portion 405 have a same width. In these examples, the first portion 404 and second portion 405 may be collectively referred to as a same or single portion. In other examples, the second portion 405 may have a width along the direction of extension of the pin 306 that is less than a width or cross-sectional area (A) of the first portion 404 and greater than a width or cross-sectional area of the neck 402. In other examples, the first portion 404 has a reduced width or cross-sectional area relative to the second portion 405. Here, the first portion 404 if formed to have a small profile by comprising a proportion of overall width (w2a) of the base 403 (including both the first portion 404 and second portion 405) that is substantially smaller than a proportion of width of the second portion 405 alone. In some examples, a dimension, e.g., length, width, area, volume, of the second portion 405, for example, surface area a2 may be the same as, similar to, or different than a corresponding dimension of the first portion 404, for example, surface area a1. In some examples, as shown in FIG. 4D, a width of the second portion 405 extending along a longitudinal axis L is less than a diameter (r) of the neck 402.

In configurations where the first portion 404 is larger than the second portion 405, and the second portion 405 is larger than the neck 402, the connection pin 306 includes a first lip 411 between the neck 402 and the second portion 405, and a second lip 412 between the second portion 405 and the base 403. The first lip 411 and second lip 412 are formed by variations in width between the neck 402, first portion 404, and second portion 405, respectively. In some examples, as shown in FIG. 4D, the distance (d) between the first lip 411 and second lip 412 is less than a diameter (r) of the neck 402. In other examples, a distance between the first lip 411 and the second lip 412 is substantially the same as a distance between the second lip 412 and an end of the base 403 that is away from the neck 402.

The first lip 411 has a smaller circumference than the second lip 412. The first lip 411 and second portion 405 are proximal the second lip 412 for reducing the amount of protrusion of the base 403 and/or neck 402 from an element of the module 300, for example, a sidewall of the enclosure 102 of the speaker array module 300, for example, shown in FIG. 3B, and a total length of the connection pin 306 along the direction of extension of the pin 306. In some examples, none or very little of the neck 402 extends from the enclosure 102. In some examples, the first lip 411 directly abuts the enclosure plate 115, for example, shown in FIG. 6A. In other examples, the first lip 411 extends through a hole 121 in the enclosure plate 115 so that that second lip 412 directly abuts the enclosure plate 115.

In some examples, the second portion 405 and first lip 411 are constructed to allow enough leverage for an improvised set of tools, for example, a fingernail, screwdriver, and so on to be inserted between the first lip 411 and wall of the enclosure plate 115, along with a paper clip, pin, or the like inserted against actuator 407 to retract the balls 406 for removing the pin 306.

Another feature of the connection pin 306 in some examples is that the removal of the connection pin 306 from the module 300 is simplified and expedient. The pin 306 may include at least one spring-loaded element, for example, a detent ball 406 and a spring-loaded actuator 407 that when pushed retracts or releases the balls 406 so that the balls 406 do not protrude from the neck 402, and do not impede a linear motion of the neck 402 when the connection pin 306 is inserted into or removed from the array module 100. Although an actuator 407 and balls 406 are shown and described, other spring loaded devices may equally apply for holding the connection pin 306 in a temporary fixed position relative to the module enclosure such as detent pins, retractable pins, button handle pins, shackle pins, indexing pins, retracting pins, release pins, thrust pins, spring loaded positioning elements, spacer bushings, plungers, or other related devices structured for holding the connecting pin 306 in place against the enclosure 102. As shown in FIGS. 6A and 6B, positioned in the neck 402 includes a spring-loaded configuration 431 between the actuator 407 and balls 406 that allows for balls 406 to retract when the actuator 407 is activated, or pressed. The balls 406 may retract in a different manner in other examples.

The balls 406 or related coupling elements, are preferably positioned along the neck 402, for example, at a mid-section or distal end of the neck 402 so that less clearance is required in the enclosure for receiving the pin 306. The balls 406 can be depressed into the neck 402 by the pressing a actuator 407, or plunger, in an opening 408 in the outermost surface of the base 403. In some examples, the balls 406 are at or near a distal end of the neck 402 (base 403 being at a proximal end of the neck 402) so that less clearance is required in the enclosure 102 to accommodate receipt of the pin 306. In some examples, the actuator 407 is positioned in the opening 408, instead of extending from the surface of the opening, to further reduce the overall protrusion length (w2a) of the base 403, i.e., substantially smaller than the protrusion length (w1a) of a conventional pin 106. In some examples, a free end of the actuator 407 is substantially co-planar with a free end of the base when the actuator is in an un-pressed state. In other words, the actuator 407 is positioned in the opening 408, and does not protrude from the base in the longitudinal direction of extension of the connection pin 306.

To remove the connection pin 306 from the opening in the module enclosure 302, the actuator 407 may be depressed and/or a user may use a fingernail positioned between the base 403 and the enclosure 302 to pry the connection pin 306 away from the module 300. With sufficient force, the balls 406 may retract toward the interior of the neck 402, permitting the neck 402 to be removed from the opening in the enclosure 102. In other examples where the actuator 407 is in the opening 408 of the base 403, a human finger cannot be used to depress the actuator 407, so that attempts to pry the connection pin 306 from the enclosure opening are intended to be difficult or unsuccessful, since the balls 406 may be positioned in grooves, openings, or the like (not shown) in the enclosure opening, and cannot be separated from the grooves, openings, or the like without depressing the actuator 407 causing the balls 406 to retract from the grooves, openings, or the like. This configuration requires the depression of the actuator 407 to remove the pin 306 to provide unintentional removal or falling out of the pin 306, for example, for safety reasons.

A tool 500 shown in FIGS. 7A-10D has a body 502 that extends in a longitudinal direction. A first end of the body 502 has a non-threaded insertion element 504. A second end of the body 502 has a threaded insertion element 506. The body 502 may have a hex-shape, or other geometry permitting a user to rotate the tool 500 or hold the tool for insertion into the connection pin 306.

The non-threaded insertion element 504 is constructed and arranged for depressing the actuator 407 in the opening 408 of the base 403 when a force is applied to the tool 500 in a translating or linear direction along which the connecting pin 306 extends, which in turn retracts the balls 406 relative to the body 402 of the pin 306, allowing the connection pin 306 to be removed. The opening 408 of the base 403 is constructed and arranged to receive the non-threaded insertion element 504, which has an area, or cross-sectional dimension that is less than that of the opening 408.

The threaded insertion element 506 is constructed and arranged for insertion into a counterpart threaded region of the opening 408, and therefore, the threaded insertion element 506 has an area, or cross-sectional dimension that is greater than that of the non-threaded insertion element 504 and/or the same or similar to that of the opening 408 so that a rotation of the tool 500 about an axis along which the opening 408 extends can permit the helical threads of the insertion element 506 to mate with the threads in the opening 408, permitting insertion to occur. When the threaded insertion element 506 is inserted in the threaded opening 408, the mating permits the tool 500 to be used for removing the pin 306 from the enclosure 102. In particular, the threaded insertion element 506 includes a portion that applies a force against the actuator 407 to depress the actuator 407, which in turn retracts the balls 406.

The non-threaded insertion element 504 of the tool 500 can be inserted in the opening 408 in the base 403 of the low profile connection pin 306 in a direction d1 at the speaker array module until the non-threaded insertion element 504 reaches the actuator 407 and applies a force against the actuator 407 until the actuator 407 activates the detent balls 406 until the balls 406 are retracted in a direction d2 perpendicular to the direction d1. The detent balls 406 may be 180 degrees from each other relative to the circumference of the neck 402. The non-threaded insertion element 504 may continue the apply a force in the direction d1 until the connection pin 306 is inserted into the speaker array module and the base 304 is proximal to or abuts the enclosure plate 115.

To remove the connection pin 306 from the opening in the module enclosure 302, as shown in FIGS. 8B, 10A-10D, the threaded insertion element 506 may be inserted in the opening 408 of the base 306, in particular, screwed into the opening 407 in a direction d1, until the threaded insertion element 506 abuts and applies a force to the actuator 407, which in turn activates the detent balls 406 until the balls 406 are retracted in a direction d2, for example, the force applied to the actuator 407 compressing a spring in the configuration 431 in the neck 402 of the connection pin 306 which in turn retracts the detent balls 406 into an opening in the neck 402 between the spring and balls 406. Since the balls 406 are retracted, the tool 500 can be pulled in a direction e1 to remove the connection pin 306 from the opening in the enclosure 102 of the speaker array module.

A number of implementations have been described. Nevertheless, it will be understood that the foregoing description is intended to illustrate and not to limit the scope of the inventive concepts which are defined by the scope of the claims. Other examples are within the scope of the following claims.

What is claimed is:
1. A connection pin, comprising:
   an elongated neck; and
   a base at an end of the neck,
      the base including:

a first portion;

a second portion between the first portion and the neck; and a lip between the first portion and the second portion, wherein a distance between the lip and the neck is less than a radius of the neck;

at least one spring-loaded element along the neck for maintaining the connection pin in a temporary fixed position relative to another element in which the neck is constructed for insertion; and an actuator that resides in an opening in the base and retracts the at least one spring-loaded element when in a pressed position, wherein an end of the actuator does not exceed a surface of the base when the actuator is in an unpressed position; and the base including an opening, wherein at least a portion of the opening in the first portion of the base being threaded, and wherein the end of the actuator extends through and is surrounded by the threaded portion of the opening.

2. The connection pin of claim 1, further comprising another lip between the neck and the second portion, wherein a distance between the lip and the other lip is less than the radius of the neck.

3. The connection pin of claim 2, wherein the lip is proximal the other lip for reducing an amount of protrusion of the base or neck from the other element.

4. The connection pin of claim 3, wherein the other element is an enclosure of a speaker array module.

5. The connection pin of claim 3, wherein a distance between the surface of the base and the first lip is less than or equal to a distance between the first lip and the second lip.

6. The connection pin of claim 1, wherein the threaded opening is for mating with a tool to remove the connection pin from the other element.

7. The connection pin of claim 6, wherein the opening is constructed and arranged to receive the tool that applies a force to the actuator to retract the spring-loaded element for removing the connection pin from the other element.

8. The connection pin of claim 1, wherein the neck and base extend in a longitudinal direction of extension, and wherein the first portion has a dimension along the longitudinal direction that is less than that of the second portion along the longitudinal direction.

9. The connection pin of claim 8, wherein the first portion has a dimension extending in a direction perpendicular to the longitudinal direction that is less than that of the second portion along the direction perpendicular to the longitudinal direction.

10. The connection pin of claim 1, wherein the spring-loaded element includes a detent ball.

11. A connection pin kit, comprising:

a connection pin, the connection pin including:

an elongated neck;

a base at an end of the neck, wherein the base includes a first portion and a second portion between the first portion and the neck, a first lip between the neck and the second portion, and a second lip between the first portion and the second portion, and wherein a distance between the first lip and the second lip is less than a radius of the neck;

an opening in the base;

an actuator in the opening;

at least one spring-loaded element extending from the neck that is advanced or retracted by the actuator; and a tool for inserting the connection pin into an element or removing the connection pin from the element, the tool comprising:

a body extending in a longitudinal direction;

a non-threaded insertion element at a first end of the body, and extending in the longitudinal direction, for inserting the connection pin into the element when positioned in the opening of the base; and a threaded insertion element at a second end of the body opposite the first end in the longitudinal direction, for removing the connection pin from the element when positioned in the opening.

12. The connection pin kit of claim 11, wherein either the non-threaded insertion element or the threaded insertion element applies a force to the actuator in the opening to retract the at least one spring-loaded element.

13. The connection pin kit of claim 11, wherein a width of the base is less than a radius of the neck.

14. The connection pin kit of claim 11, wherein the element includes a speaker array module, and wherein the connection pin removably couples the speaker array module to another speaker array module.

* * * * *